US009729871B2

United States Patent
Sakomizu

(10) Patent No.: US 9,729,871 B2
(45) Date of Patent: Aug. 8, 2017

(54) VIDEO IMAGE DECODING APPARATUS AND VIDEO IMAGE ENCODING SYSTEM

(71) Applicant: Oki Electric Industry Co., Ltd., Tokyo (JP)

(72) Inventor: Kazuhito Sakomizu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 524 days.

(21) Appl. No.: 13/940,637

(22) Filed: Jul. 12, 2013

(65) Prior Publication Data

US 2014/0029666 A1 Jan. 30, 2014

(30) Foreign Application Priority Data

Jul. 30, 2012 (JP) ................. 2012-168411

(51) Int. Cl.
| | |
|---|---|
| *H04N 19/31* | (2014.01) |
| *H04N 19/50* | (2014.01) |
| *H04N 19/573* | (2014.01) |
| *H04N 19/103* | (2014.01) |
| *H04N 19/436* | (2014.01) |
| *H04N 19/61* | (2014.01) |
| *H04N 19/587* | (2014.01) |
| *H04N 19/30* | (2014.01) |

(52) U.S. Cl.
CPC ....... *H04N 19/00569* (2013.01); *H04N 19/31* (2014.11); *H04N 19/395* (2014.11); *H04N 19/50* (2014.11); *H04N 19/573* (2014.11); *H04N 19/587* (2014.11); *H04N 19/103* (2014.11); *H04N 19/436* (2014.11); *H04N 19/61* (2014.11)

(58) Field of Classification Search
CPC ............. H04N 19/00569; H04N 19/31; H04N 19/395; H04N 19/50; H04N 19/573; H04N 19/103; H04N 19/436; H04N 19/61

See application file for complete search history.

(56) References Cited

U.S. PATENT DOCUMENTS

2012/0320986 A1 12/2012 Shimizu et al.
2013/0266078 A1* 10/2013 Deligiannis ...... H04N 19/00533
375/240.25

FOREIGN PATENT DOCUMENTS

| JP | 2012-120108 A | 6/2012 |
|---|---|---|
| WO | WO 2011-105297 A1 | 9/2011 |
| WO | WO2011105297 A1 * | 9/2011 |

OTHER PUBLICATIONS

Wiegand et al., "Overview of the H.264/AVC Video Coding Standard," IEEE Transactions on Circuits and Systems for Video Technology, Jul. 2003, pp. 1-19.*

(Continued)

*Primary Examiner* — Thai Tran
*Assistant Examiner* — Christopher T Braniff
(74) *Attorney, Agent, or Firm* — Rabin & Berdo, P.C.

(57) ABSTRACT

A video image decoding apparatus includes a plurality of predicted image generating units that generate predicted images according to respectively different methods. A predicted image combining unit combines the predicted images generated by the predicted image generating units to obtain a predicted image. A decoding unit decodes an encoded image by using, as side information, the predicted image obtained by the predicted image combining unit.

14 Claims, 8 Drawing Sheets

(56) References Cited

OTHER PUBLICATIONS

X. Artigas et al., "The Discover Codec: Architecture, Techniques and Evaluation", Picture Coding Symposium (PCS'07), Nov. 2007.
Joan Ascenso et al., "Adaptive Hash-Based Side Information Exploitation for Efficient Wyner-Ziv Video Coding" Image Processing, 2007. ICIP 2007. IEEE International Conference on (vol. 3 ), pp. 29-32, Sep. 16, 2007-Oct. 19, 2007.
Xavier Artigas et al., "Iterative Generation of Motion-Compensated Side Information for Distributed Video Coding" Image Processing, 2005. ICIP 2005. IEEE International Conference on (vol. 1 ) Sep. 11-14, 2005.
Charles Yaacoub et al., "A Genetic Frame Fusion Algorithm for Side Information Enhancement in Wyner-Ziv Video Coding", 2009 17th European Signal Processing Conference (EUSIPCO 2009), pp. 1784-1788, Aug. 28, 2009.

* cited by examiner

VIDEO IMAGE DECODING APPARATUS AND VIDEO IMAGE ENCODING SYSTEM

CROSS REFERENCE TO RELATED APPLICATION(S)

This application is based upon and claims benefit of priority from Japanese Patent Application No. 2012-168411, filed on Jul. 30, 2012, the entire contents of which are incorporated herein by reference.

BACKGROUND

The present invention relates to a video image decoding apparatus, a video image decoding program, and a video image encoding system. The present invention may be applied to, for example, an apparatus, a program, and a system that use Distributed Video Coding (DVC) method based on Slepian-Wolf theorem and Wyner-Ziv theorem.

X. Artigas, J. Ascenso, M. Dalai, S. Klomp, D. Kubasov and M. Ouaret, "The Discover Codec: Architecture, Techniques and Evaluation", in Picture Coding Symposium, 2007, vol. 2007, pp. 6-9 (hereinafter referred to as "Non-Patent Document 1") is a representative example of an article explaining a video image encoding apparatus and a video image decoding apparatus that carry out encoding and decoding of video images based on Slepian-Wolf theorem and Wyner-Ziv theorem.

The video image decoding apparatus described in Non-Patent Document 1 includes a key frame decoder that inputs a key stream and outputs key frames that have been decoded (hereinafter referred to as "decoded key frames") and a WZ frame decoder that inputs a WZ stream (where WZ is an abbreviation for "Wyner-Ziv") and outputs WZ frames that have been decoded (hereinafter referred to as "decoded WZ frames"). In the WZ frame decoder, a predicted image generating unit inputs decoded key frames and generates a predicted image, and a WZ decoding unit carries out WZ decoding on the WZ stream while using the inputted predicted image as side information (supplementary information) to obtain a decoded WZ frame.

The predicted image generating unit includes a frame buffer, and generates predicted images using, for example, bidirectional motion compensated interpolation which is used in Non-Patent Document 1. The bidirectional motion compensated interpolation assumes that a subject in the video image is moving with uniform linear motion and is a method that generates predicted images from frames picked up before and after the time to be predicted by carrying out motion estimation and motion compensation.

J. Ascenso and F. Pereira, "Adaptive Hash-Based Side Information Exploitation for Efficient Wyner-Ziv Video Coding", Image Processing 2007, ICIP 2007, 2007 (hereinafter referred to as "Non-Patent Document 2") adds the concept of a "hash" (a small piece of information) to a video image encoding apparatus and a video image decoding apparatus that carry out encoding and decoding of video images based on Slepian-Wolf theorem and Wyner-Ziv theorem.

The video image decoding apparatus in Non-Patent Document 2 also includes a key frame decoder and a WZ frame decoder. In the WZ frame decoder described in Non-Patent Document 2, a predicted image generating unit generates a predicted image from an inputted hash and decoded key frames, and a WZ decoding unit inputs the generated predicted image and a WZ stream provided from an encoding apparatus and carries out WZ decoding on the WZ stream while using the inputted predicted image as side information to obtain a decoded WZ frame.

Here, the "hash" is information for facilitating the generation of a predicted image. In Non-Patent Document 2, part of a DC (direct current) component and an AC (alternating current) component when a DCT (discrete cosine transform) has been carried out on an image in N×N pixels is used as a hash. The predicted image generating unit includes a frame buffer, and generates a predicted image by, for example, searching reference images (i.e., images in the frame buffer) for a region for which the closest hash to the inputted hash is generated (motion estimation) and carries out compensation on the region (motion compensation).

The method described in Non-Patent Document 2 generates predicted images under the assumption that motion estimation can be carried out using part of the DC component and the AC component included in the hash.

SUMMARY

In a video image decoding apparatus including a key frame decoder and a WZ frame decoder, deterioration occurs in the image quality of the predicted images in accordance with the predicted image generating method of the predicted image generating unit.

For example, when predicted images are generated from only decoded key frames as in the technique described in Non-Patent Document 1, there is deterioration in the image quality of predicted images when the assumption that the subject is moving with uniform linear motion is not true. As another example, when predicted images are generated by combining decoded key frames and a hash as in the technique described Non-Patent Document 2, there is deterioration in the image quality of the predicted images when information (for example, high frequency components (high-frequency AC components)) that is not included in the hash is important for motion estimation.

If there is deterioration in the image quality of the predicted images, there will obviously be deterioration in the quality of the decoded WZ frames.

For this reason, there is demand for a video image decoding apparatus, a video image decoding program, and a video image encoding system capable of improving the quality of decoded images without depending on the properties and the like of original images.

According to a first aspect of the present invention, there is provided a video image decoding apparatus, including: a plurality of predicted image generating units configured to generate predicted images according to respectively different methods; a predicted image combining unit configured to combine the predicted images generated by the predicted image generating units to obtain a predicted image; and a decoding unit configured to decode an encoded image by using, as side information, the predicted image obtained by the predicted image combining unit.

According to a second aspect of the present invention, there is provided a video image encoding system, including: the video image decoding apparatus according to claim 1; and a corresponding video image encoding apparatus.

According to the aspects of the present invention, it is possible to improve the quality of decoded images without depending on the properties and the like of original images.

DETAILED DESCRIPTION OF THE EMBODIMENT(S)

Figure 1:
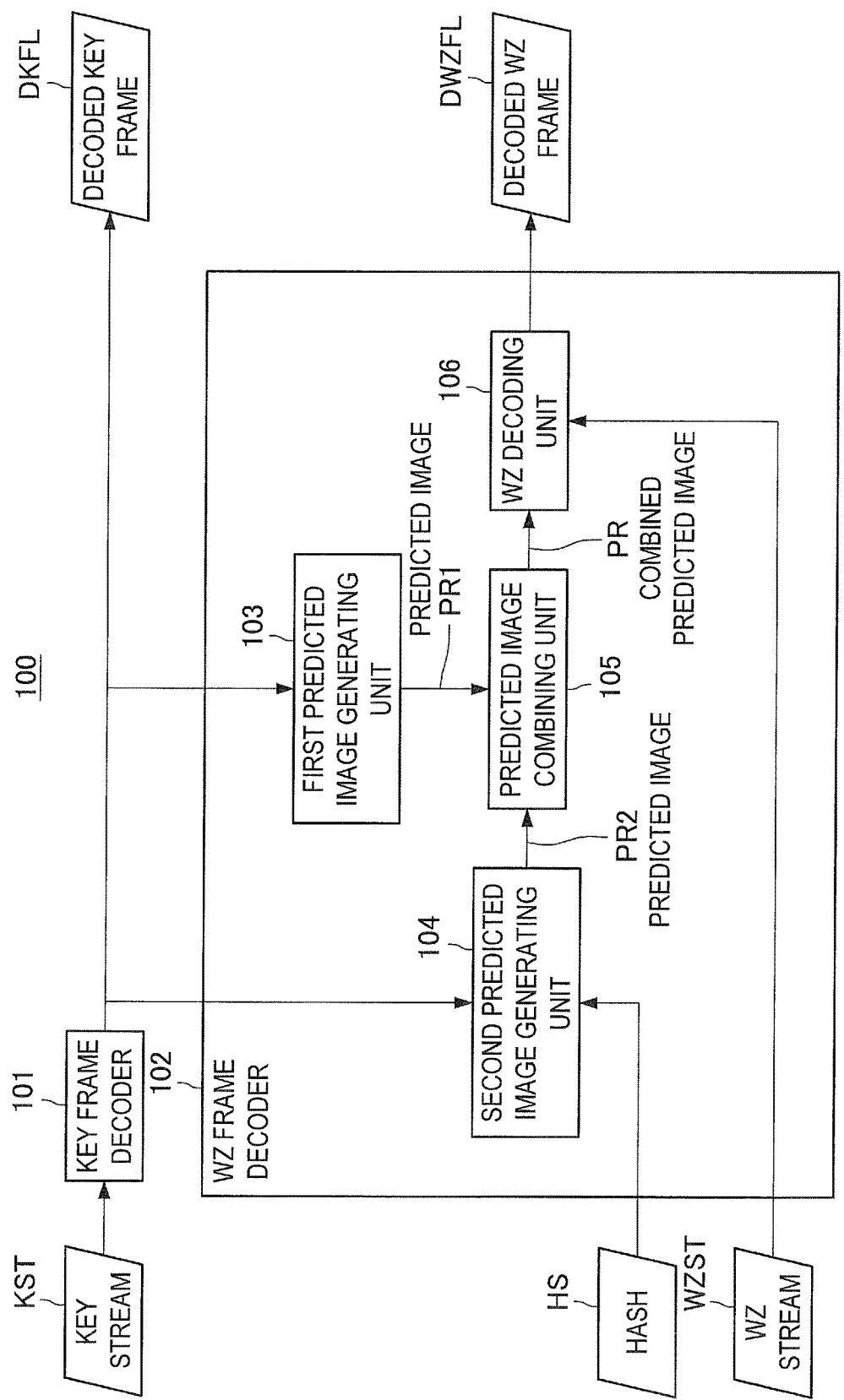
FIG. 1 is a block diagram showing an exemplary configuration of a video image decoding apparatus according to a first embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

(A) First Embodiment

A video image decoding apparatus, a video image decoding program, and a video image encoding system according to a first embodiment of the present invention will now be described in detail with reference to the drawings.

(A-1) Configuration of First Embodiment

FIG. 1 is a block diagram showing an exemplary configuration of a video image decoding apparatus according to the first embodiment. The video image decoding apparatus according to the first embodiment may be constructed in hardware by connecting various circuits, or may be constructed to realize a function as a video image decoding apparatus by having a generic apparatus with a CPU, a ROM, a RAM, and the like carry out a video image decoding program. Regardless of which of the above constructions is used, the functional configuration of the video image decoding apparatus according to the first embodiment can be expressed as shown in FIG. 1.

Note that a video image encoding system according to the first embodiment is constructed of the video image decoding apparatus according to the first embodiment and a corresponding video image encoding apparatus (not shown). As one example, it is possible to apply, to the video image encoding apparatus, the apparatus described in Non-Patent Document 2 that generates and outputs a key stream, a WZ stream, and a hash. As another example, it is possible to apply, to the video image encoding apparatus, an apparatus produced by adding a configuration for generating and outputting a hash to the configuration of the apparatus described in Non-Patent Document 1 that generates and outputs a key stream and a WZ stream.

In FIG. 1, the video image decoding apparatus 100 according to the first embodiment includes a key frame decoder 101 and a WZ frame decoder 102. The WZ frame decoder 102 includes a first predicted image generating unit 103, a second predicted image generating unit 104, a predicted image combining unit 105, and a WZ decoding unit 106.

The video image encoding apparatus (not shown) generates and transmits a key stream KST by carrying out compression by applying video image encoding on a number of frame images ("key frames") that are used as key information at intervals (which do not need to be constant intervals) of several frames. Meanwhile, for WZ frames (non-key frames) that correspond to other frames (or all frames), encoding is carried out based on Slepian-Wolf theorem and Wyner-Ziv theorem, and the obtained WZ stream WZST is transmitted. In this first embodiment, in the generating process for a WZ stream, the video image encoding apparatus generates the hash HS described above and also transmits the generated hash HS.

The key stream KST transmitted from the corresponding video image encoding apparatus is inputted into the key frame decoder 101. The key frame decoder 101 carries out a decoding process on the key stream KST to obtain a decoded key frame DKFL. The decoded key frame DKFL are provided to the next apparatus downstream (or the next program part), and are also provided to the first predicted image generating unit 103 inside the WZ frame decoder 102.

The key frame decoder 101 carries out decoding corresponding to the encoding method of the key frame. The encoding method of the key frame may be any arbitrary method. For this reason, as one example, the key frame decoder 101 may be realized by a decoder based on a hybrid encoding method. As another example, the key frame decoder 101 may be based on Slepian-Wolf theorem and Wyner-Ziv theorem.

The WZ frame decoder 102 inputs the WZ stream WZST and the hash HS transmitted from the corresponding video image encoding apparatus and the decoded key frames DKFL outputted from the key frame decoder 101. The WZ frame decoder 102 processes these input signals to obtain (decode) a WZ frame, and the obtained decoded WZ frame DWZFL is provided to the next apparatus downstream (or the next program part).

The first predicted image generating unit 103 generates a predicted image (hereinafter referred to as the "first predicted image") PR1 from only the decoded key frame DKFL.

The second predicted image generating unit 104 generates a predicted image (hereinafter referred to as the "second predicted image") PR2 from the hash HS and the decoded key frame DKFL.

The predicted image combining unit 105 generates a predicted image (hereinafter referred to as the "combined predicted image") PR produced by combining the first predicted image PR1 and the second predicted image PR2.

The WZ decoding unit 106 inputs the combined predicted image PR and the WZ stream WZST, carries out WZ decoding using the combined predicted image PR as side information, and outputs the obtained decoded WZ frame DWZFL.

(A-2) Operation of First Embodiment

Figure 2:
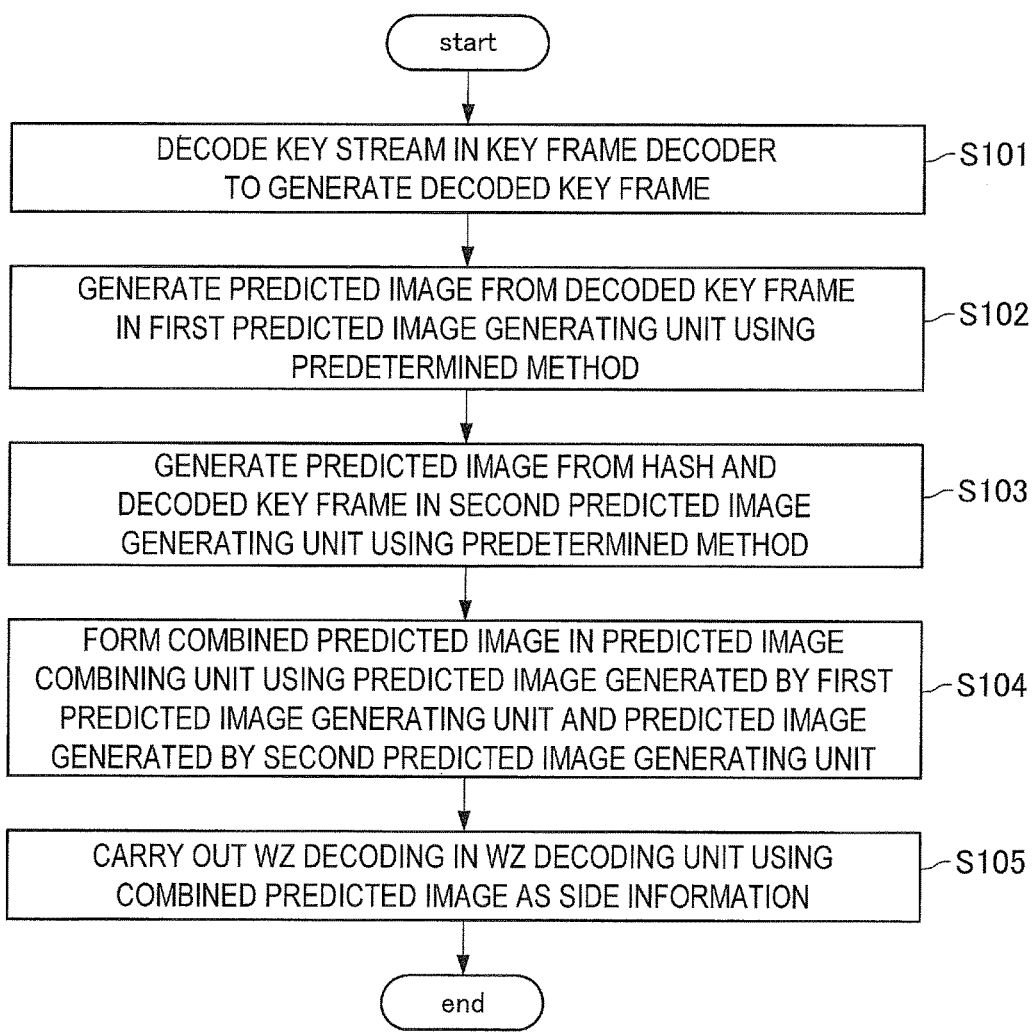
FIG. 2 is a flowchart showing an exemplary operation of the video image decoding apparatus according to the first embodiment.

Next, an exemplary operation of the video image decoding apparatus 100 according to the first embodiment will be described with reference to a flowchart in FIG. 2.

The key frame decoder 101 decodes the key stream KST to generate the decoded key frame DKFL (step S101).

Here, as for the key stream KST, data compressed according to a known hybrid encoding method such as H.264/AVC may be used. However, this is not a limitation. As one example, the key stream KST itself may be data compressed by a video image encoding apparatus that carries out encoding of video images based on Slepian-Wolf theorem and Wyner-Ziv theorem.

The first predicted image generating unit 103 generates the first predicted image PR1 from the decoded key frame DKFL using a predetermined method (step S102). For example, the first predicted image PR1 is generated using Bidirectional Motion Compensated Interpolation using the previous and following decoded key frames DKFL as described in Non-Patent Document 1.

The second predicted image generating unit 104 generates the second predicted image PR2 from the hash HS and the decoded key frame DKFL using a predetermined method (step S103). As one example, the second predicted image PR2 is generated using the method described in Non-Patent Document 2. That is, the second predicted image PR2 is generated by searching a reference image (decoded key frame DKFL stored in an internal frame buffer) for a region for which the closest hash to the inputted hash HS is generated (motion estimation) and carrying out compensation on the region (motion compensation). Here, the decoded key frame DKFL used as the reference image may be the frame in the past (behind) relative to the present time, the frame in the future (in front of) relative to present time, or the frames both in the past (behind) and in the future (in front of) relative to the present time.

The predicted image combining unit 105 generates the combined predicted image PR by combining the first predicted image PR1 generated by the first predicted image generating unit 103 and the second predicted image PR2 generated by the second predicted image generating unit 104 (step S104). The method of combining the two predicted images may be any arbitrary method. As one example, a mean value (which may be a simple mean or a weighted mean with fixed weightings) of the pixel value in the first predicted image PR1 and the pixel value in the second predicted image PR2 is calculated for each pixel, and the calculated mean value is set as the pixel value of the combined predicted image PR.

The WZ decoding unit 106 uses the combined predicted image PR as side information to carry out WZ decoding and generate a decoded WZ frame DWZFL (step S105).

Here, suppose that a pixel value in the original image is 50, the pixel value in the first predicted image PR1 is 40, and the pixel value in the second predicted image PR2 is 70. In this case, the pixel value of the combined predicted image PR is (40+70)/2=55. While the difference (i.e., the absolute value of the difference) between the pixel value of the first predicted image PR1 and the pixel value of the original image is 10 (=|40−50|) and the difference (i.e., the absolute value of the difference) between the pixel value of the second predicted image PR2 and the pixel value of the original image is 20 (=|70−50|), the difference (i.e., the absolute value of the difference) between the pixel value of the combined predicted image PR and the pixel value of the original image is 5 (=|55−50|). Thus, the difference between the combined predicted image PR and the original image is the smallest.

As described above, the quality of the combined predicted image PR is generally higher than the quality of the first predicted image PR1 and/or the second predicted image PR2.

(A-3) Effect of First Embodiment

According to the first embodiment, since a predicted image obtained by combining the first and second predicted images that were generated by the first and second predicted image generating units and have different deterioration characteristics is inputted into the WZ decoding unit, it is possible to improve the quality of the side information inputted into the WZ decoding unit and as a result to improve the quality of the decoded images.

The effect described above can be achieved regardless of the encoding method of the key frame.

(B) Second Embodiment

Next, a video image decoding apparatus, a video image decoding program, and a video image encoding system according to a second embodiment of the present invention will be described in detail with reference to the drawings.

(B-1) Configuration of the Second Embodiment

Figure 3:
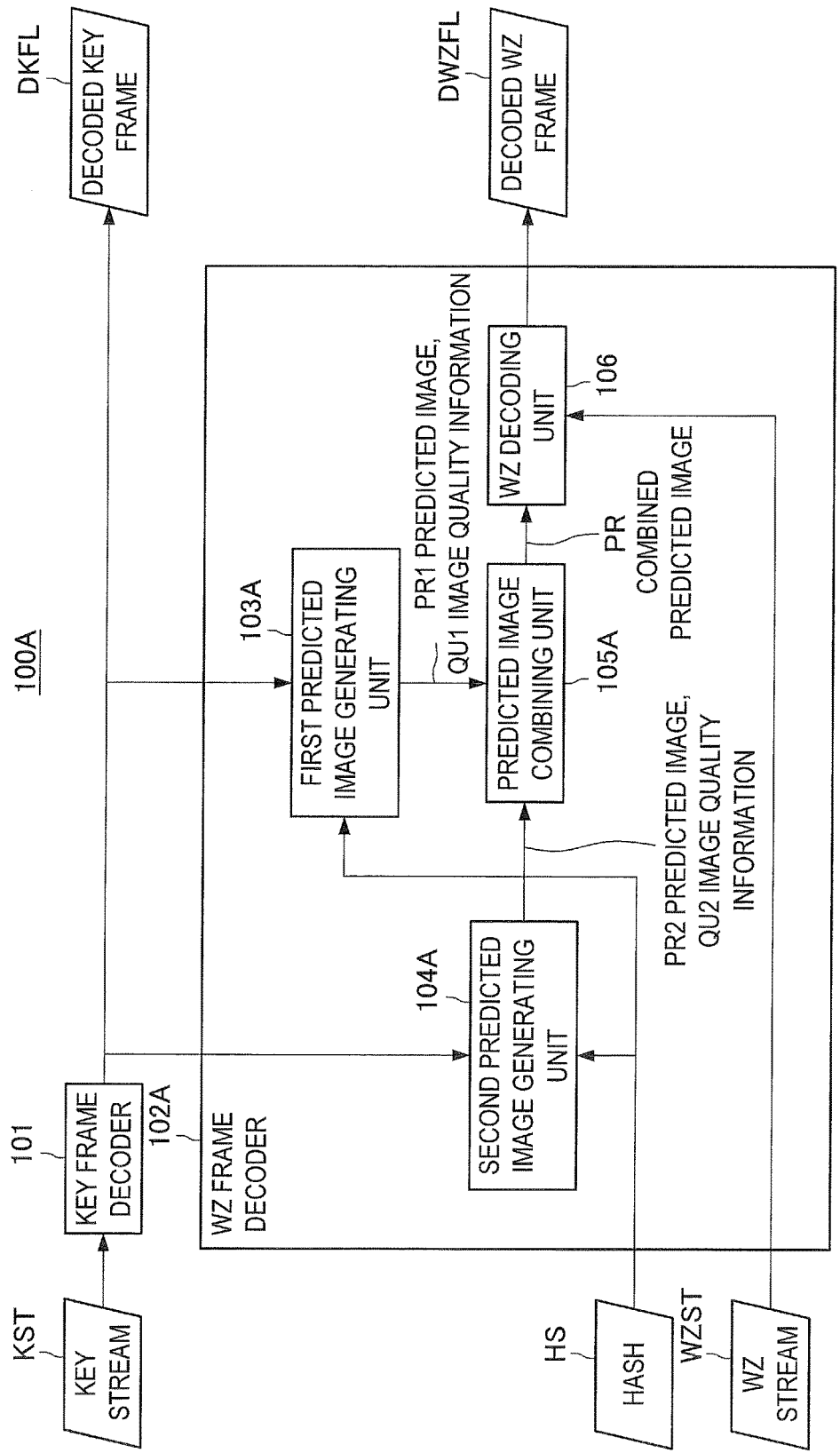
FIG. 3 is a block diagram showing an exemplary configuration of a video image decoding apparatus according to a second embodiment.

FIG. 3 is a block diagram showing an exemplary configuration of a video image decoding apparatus according to the second embodiment, where those parts that are the same as/corresponding to those parts in FIG. 1 showing the first embodiment are designated by the same/corresponding reference numerals as in FIG. 1.

In FIG. 3, the video image decoding apparatus 100A according to the second embodiment includes the key frame decoder 101 and a WZ frame decoder 102A, and the WZ frame decoder 102A includes a first predicted image generating unit 103A, a second predicted image generating unit 104A, a predicted image combining unit 105A, and a WZ decoding unit 106A. However, the first predicted image generating unit 103A, the second predicted image generating unit 104A and the predicted image combining unit 105A differ to the corresponding elements in the first embodiment.

The first predicted image generating unit 103A in the second embodiment generates a first predicted image PR1 and also image quality information (hereinafter referred to as the "first image quality information") QU1 relating to the first predicted image PR1 from the inputted hash HS and the decoded key frames DKFL. The method by which the first predicted image generating unit 103A generates the first predicted image PR1 is the same as in the first embodiment.

The second predicted image generating unit 104A according to the second embodiment generates not only the second predicted image PR2 from the inputted hash HS and the decoded key frames DKFL but also generates image quality information (hereinafter referred to as the "second image quality information") QU2 relating to the second predicted image PR2. The method by which the second predicted image generating unit 104A generates the second predicted image PR2 is the same as in the first embodiment.

The predicted image combining unit 105A combines the first and second predicted images PR1 and PR2 so as to reflect weightings of the first and second predicted images PR1 and PR2 based on the first and second image quality information QU1 and QU2, and outputs the obtained combined predicted image PR to the WZ decoding unit 106. A weighted mean where weightings based on the first and second image quality information QU1 and QU2 can be given as an example of the combining method used by the predicted image combining unit 105A.

Figure 4:
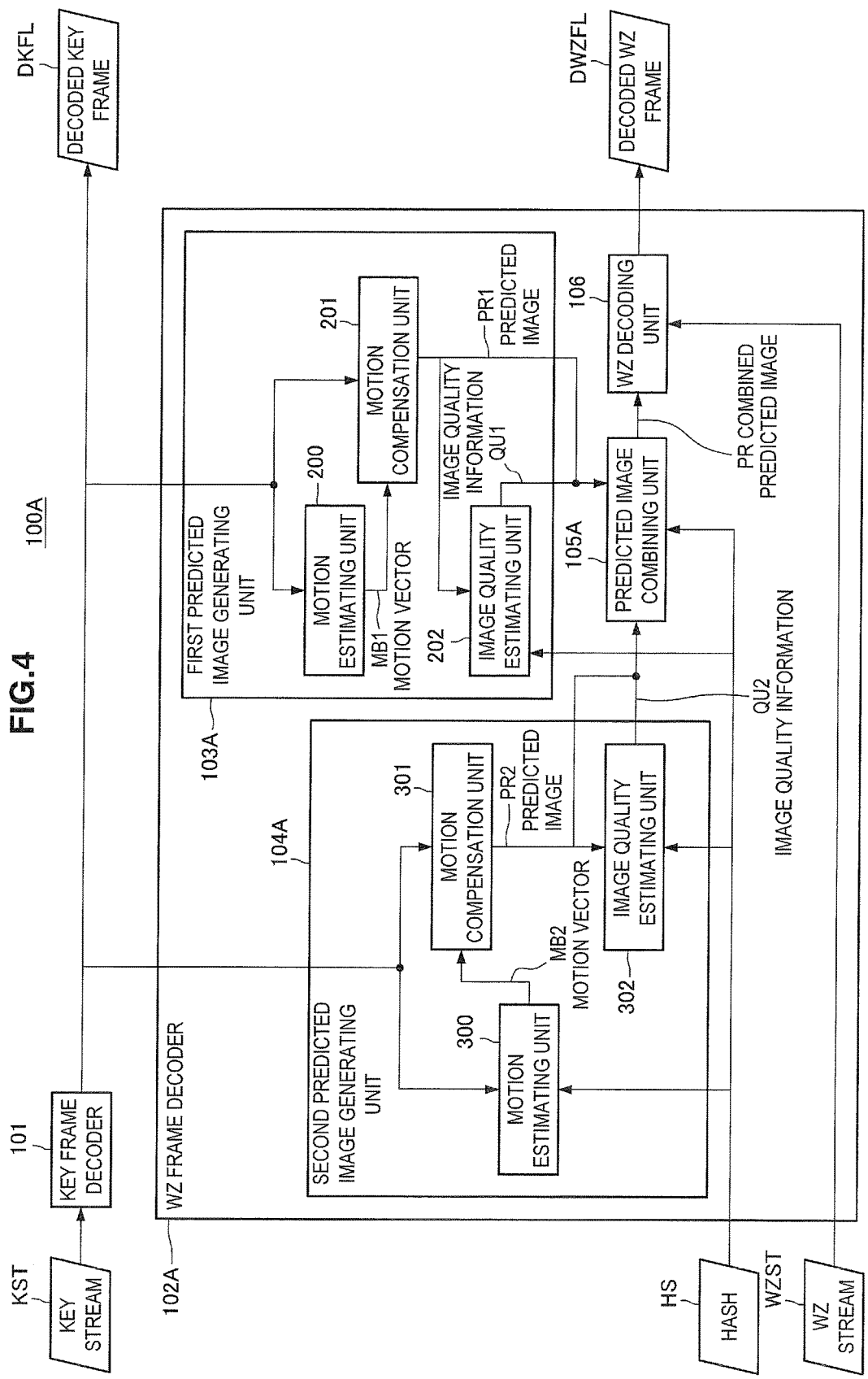
FIG. 4 is a block diagram showing a first example of the detailed configuration of a first predicted image generating unit and a second predicted image generating unit in the second embodiment.

FIG. 4 is a block diagram showing a first example of the detailed configuration of the first predicted image generating unit 103A and the second predicted image generating unit 104A.

In FIG. 4, the first predicted image generating unit 103A includes an estimating unit (motion vector estimating unit) 200, a motion compensation unit 201, and an image quality estimating unit 202.

The motion estimating unit 200 estimates a motion vector MB1 from the decoded key frames DKFL. The motion compensation unit 201 generates the first predicted image PR1 from the motion vector MB1 and the decoded key frames DKFL. The image quality estimating unit 202 obtains the first image quality information QU1 from the hash HS and the first predicted image PR1. As the motion estimating unit 200 and the motion compensation unit 201, it is possible to apply the predicted image generation described in Non-Patent Document 1.

In FIG. 4, the second predicted image generating unit 104A includes a motion estimating unit (motion vector estimating unit) 300, a motion compensation unit 301, and an image quality estimating unit 302.

The motion estimating unit 300 estimates a motion vector MB2 from the hash HS and the decoded key frame DKFL. The motion compensation unit 301 generates the second predicted image PR2 from the motion vector MB2 and the decoded key frame DKFL. The image quality estimating unit 202 obtains the second image quality information QU2 from the hash HS and the second predicted image PR2. As the motion estimating unit 300 and the motion compensation unit 301, it is possible to apply the predicted image generation described in Non-Patent Document 2.

The image quality estimating units 202 and 302 form the image quality information QU1 and QU2 according to the same method. The following describes a method of forming image quality information (the first image quality information QU1) with the image quality estimating unit 202 as an example. Here, the image quality information is an estimated value of image quality.

The image quality estimating unit 202 generates a hash HSPR1 from the generated first predicted image PR1 and sets the difference in magnitude between the generated hash HSPR1 and the inputted hash HS as the predicted value of image quality (the first image quality information QU1).

Figure 5:
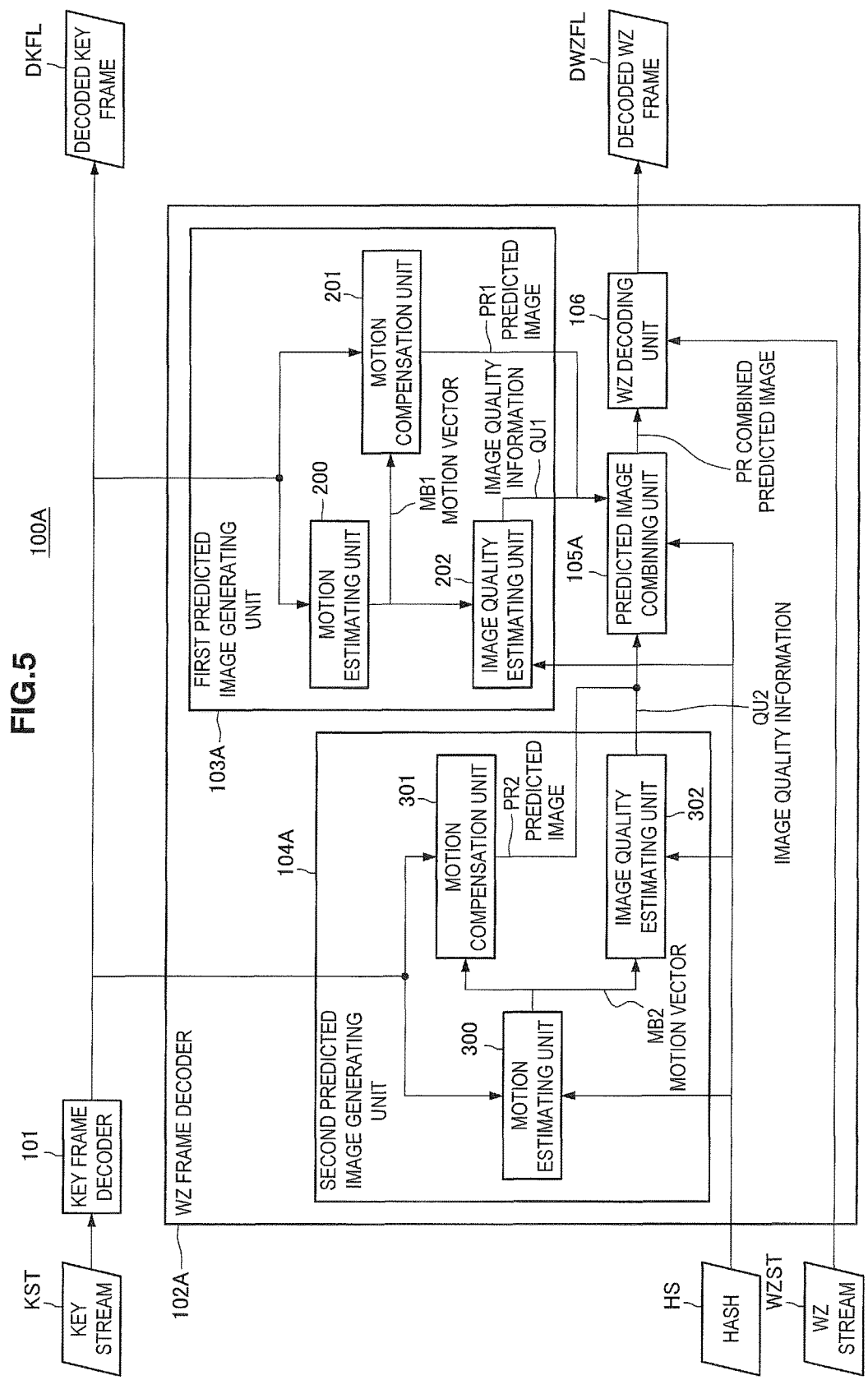
FIG. 5 is a block diagram showing a second example of the detailed configuration of the first predicted image generating unit and the second predicted image generating unit in the second embodiment.

FIG. 5 is a block diagram showing a second example of the detailed configuration of the first predicted image generating unit 103A and the second predicted image generating unit 104A. Those parts that are the same as/corresponding to those parts in FIG. 4 are designated by the same/corresponding reference numerals.

In FIG. 5, the first predicted image generating unit 103A includes the motion estimating unit 200, the motion compensation unit 201, and the image quality estimating unit 202, with the image quality estimating unit 202 differing to the example detailed configuration in FIG. 4. The image quality estimating unit 202 obtains the first image quality information QU1 from the inputted hash HS and the motion vector MB1.

The second predicted image generating unit 104A includes the motion estimating unit 300, the motion compensation unit 301, and the image quality estimating unit 302, with the image quality estimating unit 302 differing to the example detailed configuration in FIG. 4. The image quality estimating unit 302 obtains the second image quality information QU2 from the inputted hash HS and the motion vector MB2.

The image quality estimating units 202 and 302 in FIG. 5 form the image quality information QU1 and QU2 from the hash HS and the motion vectors MB1, MB2, respectively, according to the same method. The following describes a method of forming image quality information (the first image quality information QU1) with the image quality estimating unit 202 as an example. Here, the image quality information is a predicted value of image quality.

In the same way as in Non-Patent Document 2, it is assumed that the hash HS is part of the DC component and the AC component. An image PRHS is generated from the hash HS and an image PRHS2 is also generated from the hash HS2 for the same time as the reference image used to estimate the motion vector, an evaluation value for the motion vector MB1 that was used to generate the first predicted image PR1 is obtained between the image PRHS generated from the hash HS and the image PRHS2 generated from the hash HS2, and the obtained evaluation value is set as an estimated value of image quality (the first image quality information QU1). Note that although there is a partial drop in performance compared to the method described above, in place of such method, it is also possible to generate the image PRHS from the hash HS at the time used to estimate the motion vector, to obtain an evaluation value of the motion vector MB1 used to generate the first predicted image PR1 between the image PRHS generated from the hash HS and the first predicted image PR1, and to set the obtained evaluation value as an estimated value of image quality (the first image quality information QU1).

In the case of the technique described in Non-Patent Document 2, it is possible to generate the image PRHS from the hash HS by carrying out an inverse discrete cosine transform (IDCT). As examples of the evaluation value for the motion vector, it is possible to use the sum of absolute differences (SAD) for the pixel values of each pixel and the mean of absolute differences (MAD) for the pixel values of each pixel.

If the unit for estimating motion vectors (for example, it is assumed that motion vectors are obtained in M×M pixel block units) is smaller than a DCT block (for example, it is assumed that DCT is carried out in N×N pixel block units), that is, if M<N, by using the evaluation value of the motion vector as quality information, it is possible to estimate the image quality of pixels in N×N pixel block units.

(B-2) Operation of Second Embodiment

Figure 6:
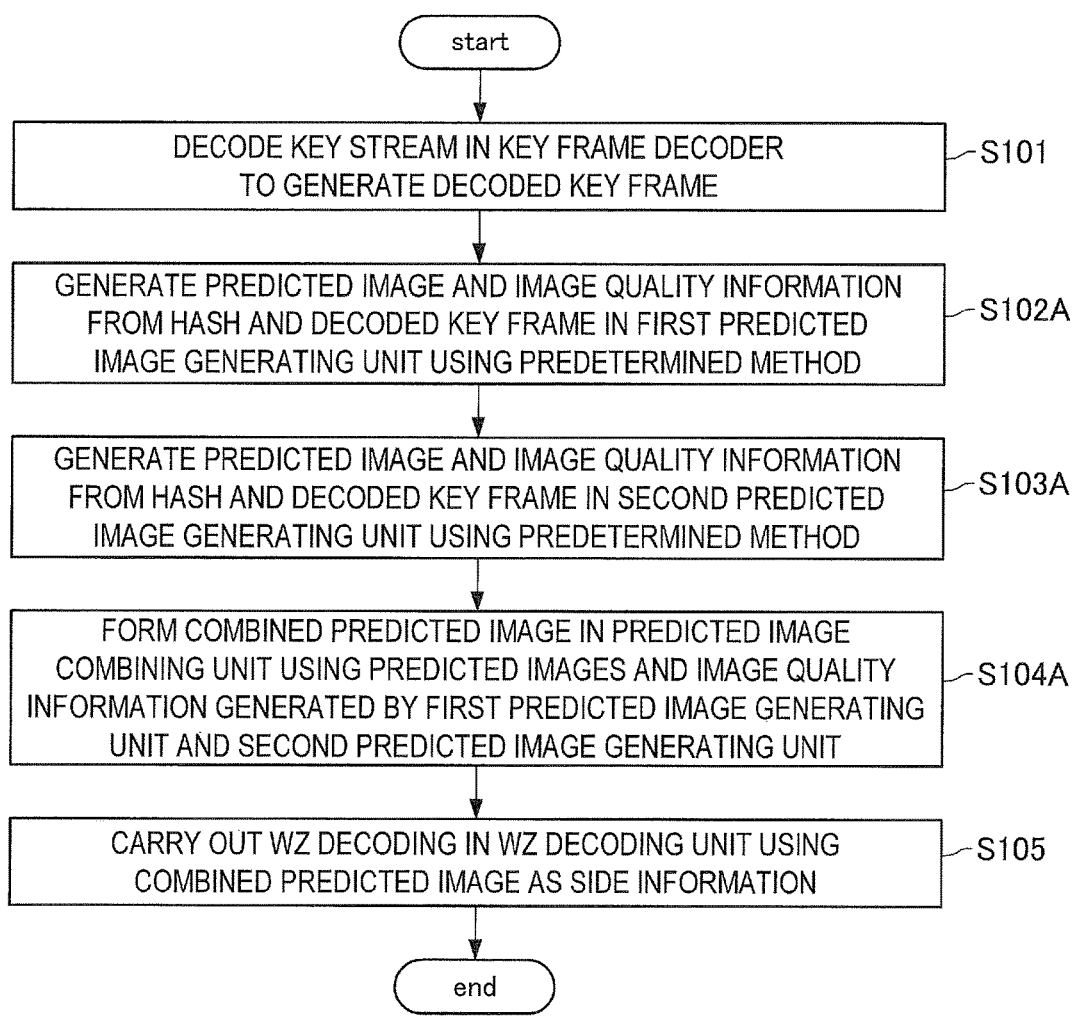
FIG. 6 is a flowchart showing an exemplary operation of the video image decoding apparatus according to the second embodiment.

Next, an exemplary operation of the video image decoding apparatus 100A according to the second embodiment will be described with reference to the flowchart in FIG. 6. In FIG. 6, those steps that are the same as/corresponding to those steps in FIG. 2 showing the first embodiment are designated by the same/corresponding reference numerals.

The key frame decoder 101 decodes the key stream KST to generate the decoded key frame DKFL (step S101).

The first predicted image generating unit 103A generates the first predicted image PR1 and the first image quality information QU1 from the hash HS and the decoded key frame DKFL using a predetermined method (step S102A).

The second predicted image generating unit 104A generates the second predicted image PR2 and the second image quality information QU2 from the hash HS and the decoded key frame DKFL using a predetermined method (step S103A).

Here, the method of generating the image quality information QU1, QU2 is the method explained using FIG. 4 or FIG. 5.

The predicted image combining unit 105A combines the predicted images PR1 and PR2 generated by the first predicted image generating unit 103A and the second predicted image generating unit 104A using the image quality information QU1, QU2 generated by the first predicted image generating unit 103A and the second predicted image generating unit 104A as combining parameters to obtain the combined predicted image PR (step S104A).

As one example, it is possible to use the weighted mean described below as the method of combining the predicted images PR1 and PR2 with the image quality information QU1 and QU2 as combining parameters.

It is assumed that for a given pixel in the first predicted image PR1, the pixel value is P1 and the image quality is Q1 and that for a pixel at the same position in the second predicted image PR2, the pixel value is P2 and the image quality is Q2.

If, as one example, a hash is generated from the generated predicted images and the image quality information Q1 and Q2 is given by the difference in magnitude between the generated hash and the hash HS, the pixel value P of the combined predicted image PR is obtained by a weighted mean according to Equation (1) below. The image quality information is a cost where a lower value expresses a higher image quality. For this reason, if the image quality information (cost) is low, the weighting of the other predicted image is set low to increase the selectivity of the predicted images corresponding to the image quality information. An equation that expresses this concept is given as Equation (1).

$$P=[Q2/(Q1+Q2)]*P1+[Q1/(Q1+Q2)]*P2 \quad (1)$$

As another method of combining the predicted images PR1 and PR2 with the image quality information QU1, QU2 as combining parameters, it is possible to use selection of higher image quality as described below. The pixel value with the higher image quality is selected from the pixel values of the two predicted images and the selected pixel value is set as the pixel value of the combined predicted image.

Finally, the WZ decoding unit 106 carries out WZ decoding using the combined predicted image as side information to generate a decoded WZ frame DWZFL (step S105).

(B-3) Effect of Second Embodiment

According to the second embodiment, since the predicted image obtained by combining the first and second predicted images that were generated by the first and second predicted image generating units and have different deterioration characteristics is inputted into the WZ decoding unit, it is possible to improve the quality of the side information inputted into the WZ decoding unit and as a result to improve the quality of the decoded images.

Here, in the second embodiment, since image quality information of the first and second predicted images is also obtained and the first and second predicted images are combined so as to reflect the image quality, the combined predicted image can be expected to have high image quality equal to or greater than in the first embodiment.

The improvement in image quality of the combined predicted image in many cases when a combined predicted image is formed by taking a weighted mean of the first and second predicted images using the image quality information of the first and second predicted image compared to when the combined predicted image is formed by taking a simple mean of the first and second predicted images will now be described with reference to FIGS. 7 and 8.

Figure 7:
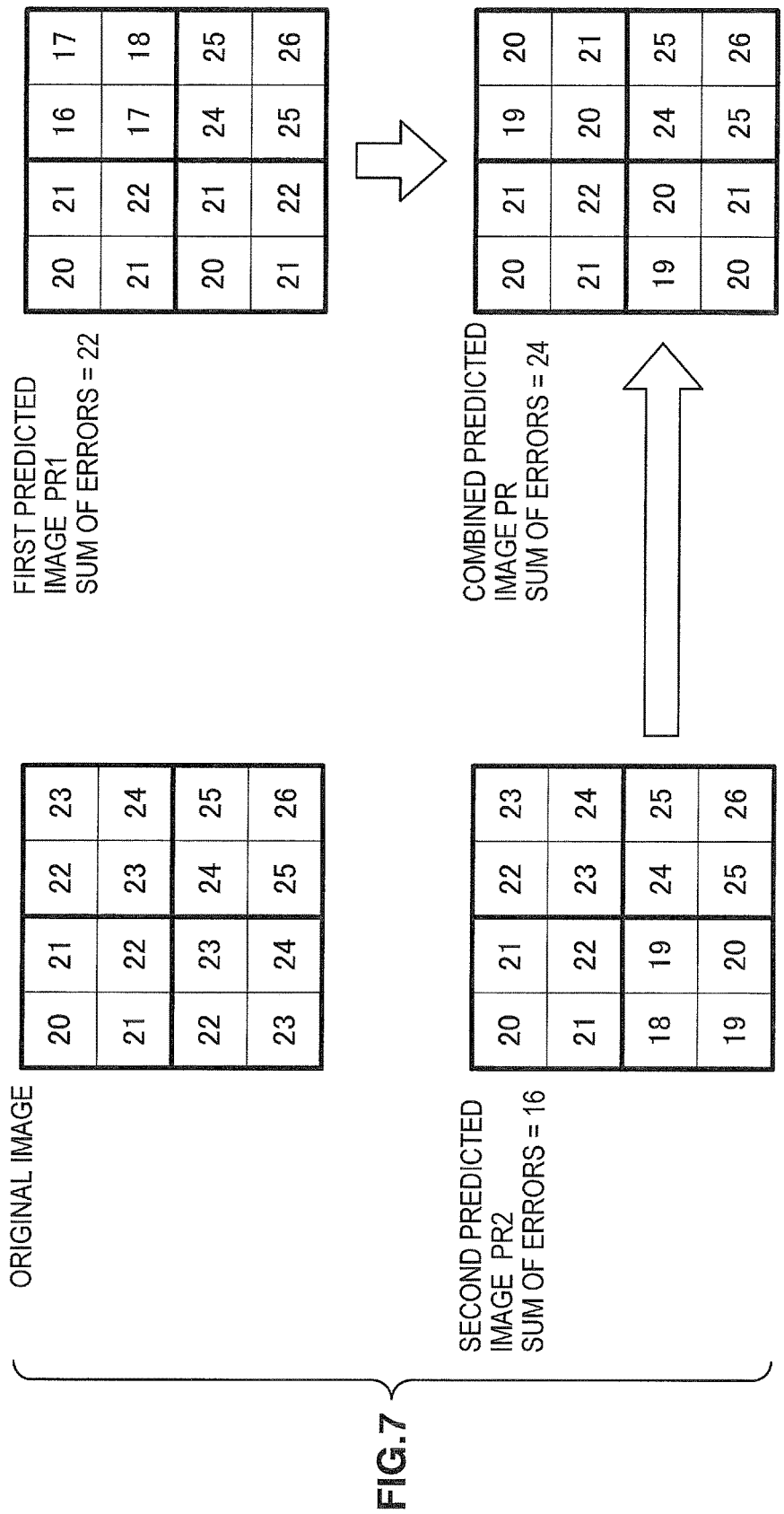
FIG. 7 is a first exemplary diagram for explaining the effect of the second embodiment.

FIG. 7 shows a case where the combined predicted image is formed by calculating a simple mean of the first and second predicted images. FIG. 8 shows a case where the image quality information of the first and second predicted images is used to calculate a weighted mean of the first and second predicted images and thereby form a combined predicted image. For ease of explanation, FIG. 7 and FIG. 8 show an example of an image with 4×4 pixels, making a total of 16 pixels. Out of the four images in each of FIG. 7 and FIG. 8, the upper left image shows the original image, the upper right image shows the first predicted image PR1, the lower left image shows the second predicted image PR2, and the lower right image shows the combined predicted image PR.

With this example, in the first predicted image PR1, compared to the original image, there is deterioration in the four upper right pixels and the four lower left pixels (i.e., these pixels have different values to the original image), and in the second predicted image PR2, there is deterioration in the four lower left pixels compared to the original image. In this example, deterioration is shown as occurring in units of 2×2 pixel blocks to simplify the explanation.

The respective sums of errors of the predicted images are calculated as "22" for the first predicted image PR1 and "16" for the second predicted image PR2.

The combined predicted image PR in FIG. 7 is generated by obtaining the mean value of the first predicted image PR1 and the second predicted image PR2 for each pixel. For example, in the case of the lower left pixel, since the pixel value of the first predicted image PR1 is "21" and the pixel value of the second predicted image PR2 is "19", "20" which is the mean value of these values is set as the value of the lower left pixel of the combined predicted image PR. The sum of errors of the combined predicted image PR is calculated as "24". This sum of errors is larger than the respective sums of errors of the first predicted image PR1 and the second predicted image PR2.

As described above, in a case where the second predicted image PR2 has higher quality than the first predicted image PR1 in a given region but the first predicted image PR1 has higher quality than the second predicted image PR2 in another region, there can be cases where a combined predicted image PR generated by processing that calculates a simple mean of the first predicted image PR1 and the second predicted image PR2 has lower quality than the first predicted image PR1 and the second predicted image PR2.

Figure 8:
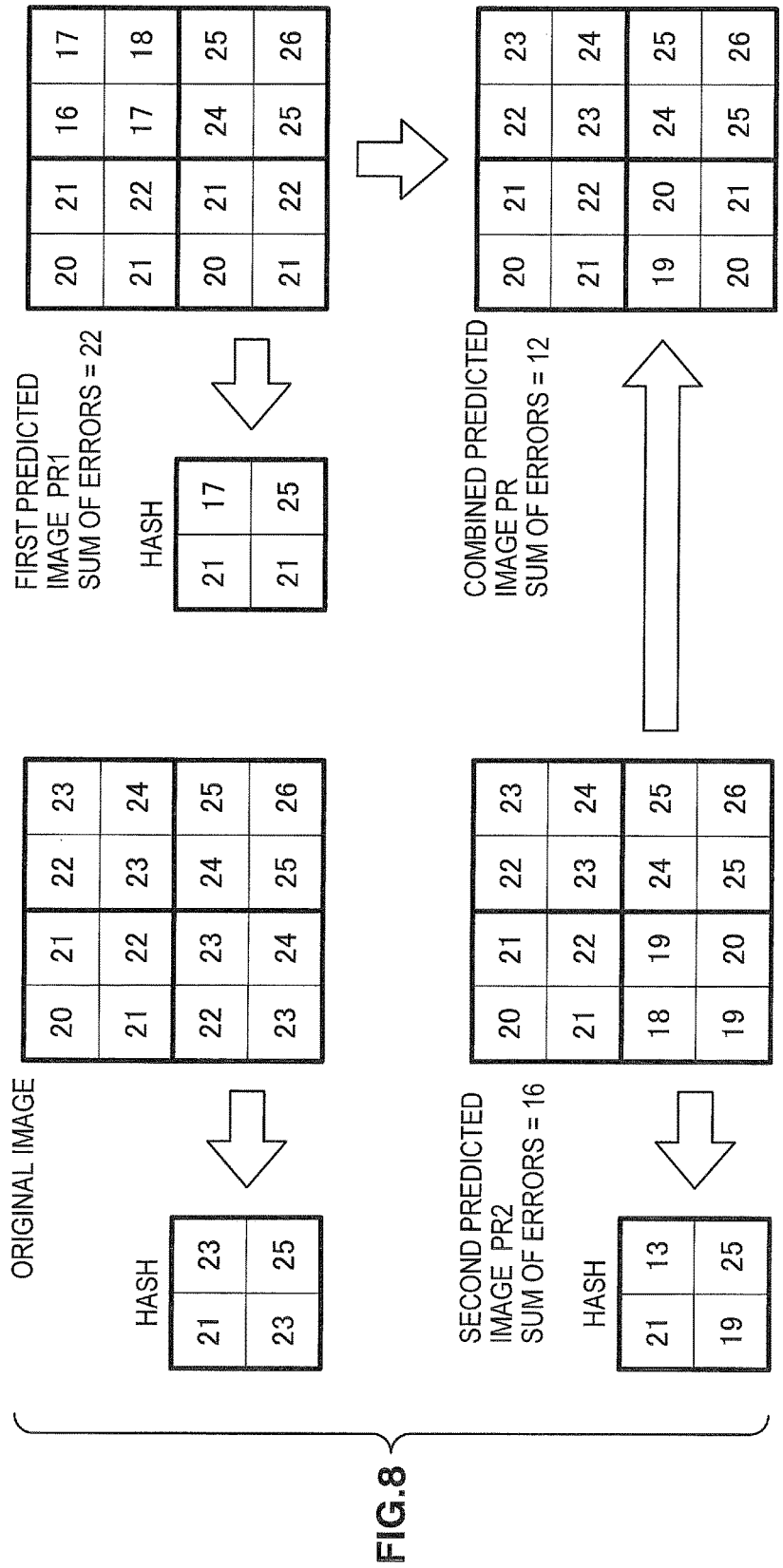
FIG. 8 is a second exemplary diagram for explaining the effect of the second embodiment.

FIG. 8 shows a case where the second embodiment uses the method of forming the image quality information explained with reference to FIG. 4.

In this example, the hash is set as the DC component of each pixel block. That is, the DC component is found for each 2×2 pixel block and set as the hash.

In the second embodiment, the image quality of the predicted images is estimated using the hash of the original image and the hash of the predicted image, and the combined predicted image PR is generated by obtaining a weighted mean of pixel values based on the image quality. Here, the hash HS of the original image is data provided from the corresponding video image encoding apparatus. If there is deterioration in the predicted images PR1 and PR2, there is high probability that the hashes of the predicted images PR1 and PR2 will differ to the hash of the original image. In the case shown in FIG. 8, the hashes of the predicted images have different values to the hash of the original image in regions where there is deterioration in the predicted images. Here, the difference between the hash of a predicted image and the hash of the original image is used as the image quality of the predicted image.

Since a weighted mean is calculated in pixel units, the image quality is necessary in pixel units. As in this example, when the hash is provided in units of 2×2 pixel blocks, the image quality (i.e., the difference between hashes) is also provided in units of 2×2 pixel blocks. In such a case, the image quality of a 2×2 pixel block is assigned to all four pixels included in the 2×2 pixel block.

For example, when obtaining the pixel value of the lower left pixel in the combined predicted image PR, the image quality of the lower left pixel of the first predicted image PR1 is |21−23|=2, and the image quality of the lower left pixel of the second predicted image PR2 is |19−23|=4. Using such image quality information, the weighted mean of the pixel value of the lower left pixel is obtained as [4/(2+4)]*21+[2/(2+4)]*19=20.3333 . . . . When the pixel value is expressed as an integer, the pixel value of the combined predicted image PR is given as 20 after rounding off.

The pixel value of every pixel is calculated according to the same procedure to produce the combined predicted image PR in FIG. 8. As a result, the sum of errors of the obtained combined predicted image is "12". Since the sum of errors of the first predicted image PR1 is "22" and the sum of errors of the second predicted image PR2 is "16", the combined predicted image PR realizes the lowest sum of errors.

(C) Other Embodiments

Although configurations where the WZ frame decoder includes the first and second predicted image generating units and the obtained first and second predicted images are combined by the predicted image combining unit are described in the above embodiments, the number of predicted image generating units is not limited to two and it is possible for the WZ frame decoder to include three or more predicted image generating units. However, it is necessary for each predicted image generating unit to use a different method of generating a predicted image.

Also, although a simple mean of a plurality of pixel values, a weighted mean of a plurality of pixel values, and selection from a plurality of pixel values according to image quality information have been described as methods of combining a plurality of predicted images in the above embodiments, the method of combining is not limited to these methods. As one example, if there are three or more predicted image generating units, it is also possible to select a median value from a plurality of pixel values or to select a mode value.

Although the methods described in Non-Patent Document 1 and Non-Patent Document 2 have been given as examples of the methods by which the predicted image generating units generate the predicted images in the above embodiments, it should be obvious that the methods by which the predicted image generating units generate the predicted images are not limited to these methods. For example, in addition to methods that generate the predicted images by interpolation, it is also possible to use methods that generate the predicted images by extrapolation. It is also possible to generate predicted images using WZ frames obtained by decoding.

Although an evaluation value (cost) of a motion vector is calculated between images generated from hashes as image quality information in the second embodiment described above, the evaluation value (cost) of a motion vector that can be used as image quality information may be found between two other images. As one example, as described in X. Artigas and L. Tones, "Iterative Generation of Motion-Compensated Side Information for Distributed Video Coding", IEEE International Conference on Image Processing 2005, p.I-833, 2005, if an image that has been subjected to WZ decoding is available, it is also possible to calculate the evaluation value (cost) of a motion vector between such image that has been WZ decoded and a decoded key frame DKFL (reference frame). Since an image that has been WZ decoded and a decoded key frame DKFL both include more information than a hash, by calculating the evaluation value of a motion vector using such increased amount of information, it is possible to acquire image quality information with even higher precision.

Although configurations where the combined predicted image is inputted into the WZ decoding unit are shown in the above embodiments, it is also possible for the combined predicted image to be provided to and processed by other processing units.

Although a case where the encoding method of non-key frames is encoding based on Slepian-Wolf theorem and Wyner-Ziv theorem is described in the above embodiments, any encoding method where the decoding side generates and uses predicted images may be used, and the present invention is not limited to encoding based on Slepian-Wolf theorem and Wyner-Ziv theorem.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A video image decoding apparatus, comprising:
   a processor; and
   a non-transitory storage medium containing program instructions, execution of which by the processor causes the video image decoding apparatus to provide functions of
   a plurality of predicted image generating units each configured to
      generate a predicted image according to one of a plurality of different methods,
      estimate an image quality of the generated predicted image, and
      output the estimated image quality as image quality information, which includes a plurality of image quality values each corresponding to a pixel of the generated predicted image, together with the generated predicted image;
   a predicted image combining unit configured to generate a combined predicted image that is a weighted average of the generated predicted images, by, for each pixel of the combined predicted image,
      determining a plurality of pixels, each in one of the generated predicted images at a same pixel location as that of said each pixel in the combined predicted image,
      weighting a pixel value of each determined pixel by the image quality value corresponding to said each determined pixel, and
      summing the weighted pixel values; and
   a decoding unit configured to decode an encoded image by using, as side information, the combined predicted image obtained by the predicted image combining unit.

2. The video image decoding apparatus according to claim 1, wherein the execution of the program instructions by the processor causes the video image decoding apparatus to further provide functions of a key frame decoding unit configured to decode a key frame encoded image produced by encoding a key frame,
   wherein the decoding unit decodes a non-key frame encoded image produced by encoding a non-key frame, and
   the predicted image generating units generate the predicted images using at least the decoded key frame.

3. The video image decoding apparatus according to claim 2, wherein
at least one of the predicted image generating units generates a predicted image using a hash provided from a corresponding video image encoding apparatus.

4. The video image decoding apparatus according to claim 3, wherein
at least one of the predicted image generating units generates a predicted image from decoded key frames at previous and following times, and
at least another of the predicted image generating units generates a predicted image from the hash and one of the decoded key frame at the previous time, the decoded key frame at the following time, and the decoded key frames at the previous and following times.

5. The video image decoding apparatus according to claim 1, wherein
each of the predicted image generating units estimates the image quality based on each pixel in the predicted image, and outputs the estimated image quality as the image quality information.

6. The video image decoding apparatus according to claim 1, wherein
the video image decoding apparatus is provided with a hash from a corresponding video image encoding apparatus, and
each of the predicted image generating units generates a hash from the generated predicted image, and generates the image quality information by using a difference between the generated hash and the provided hash as an estimated value of the image quality.

7. The video image decoding apparatus according to claim 1, wherein
the video image decoding apparatus is provided with a hash from a corresponding video image encoding apparatus, and
each of the predicted image generating units generates an image from a hash from a time used to estimate a motion vector, obtains an evaluation value of the motion vector used to generate the predicted image between the image generated from the hash and the predicted image, and generates the image quality information using the evaluation value as an estimated value of the image quality.

8. The video image decoding apparatus according to claim 7,
wherein each of the predicted image generating units calculates, as the evaluation value of the motion vector, one of a sum of absolute differences between pixel values of each pixel and a mean of absolute differences between pixel values of each pixel between the image generated from the hash and the predicted image.

9. A video image decoding apparatus, comprising:
a processor; and
a non-transitory storage medium containing program instructions, execution of which by the processor causes the video image decoding apparatus to provide functions of
a plurality of predicted image generating units each configured to
generate a predicted image according to one of a plurality of different methods,
estimate an image quality of the generated predicted image, and
output the estimated image quality as image quality information, which includes a plurality of image quality values each corresponding to a pixel of the generated predicted image, together with the generated predicted image;
a predicted image combining unit configured to generate a combined predicted image by, for each pixel of the combined predicted image,
determining a plurality of pixels, each in one of the generated predicted images at a same pixel location as that of said each pixel in the combined predicted image,
obtaining on pixel, among the plurality of determined pixels, that has a highest image quality value corresponding thereto based on the image quality information, and
setting a pixel value of the obtained pixel as a pixel value of said each pixel of the combined predicted image, and
a decoding unit configured to decode an encoded image by using, as side information, the combined predicted image obtained by the predicted image combining unit.

10. The video image decoding apparatus according to claim 9,
wherein each of the predicted image generating units estimates the image quality based on each pixel in the predicted image, and outputs the estimated image quality as the image quality information.

11. The video image decoding apparatus according to claim 9,
wherein the video image decoding apparatus is provided with a hash from a corresponding video image encoding apparatus, and
each of the predicted image generating units generates a hash from the generated predicted image, and generates the image quality information by using a difference between the generated hash and the provided hash as an estimated value of image quality.

12. The video image decoding apparatus according to claim 9,
wherein the video image decoding apparatus is provided with a hash from a corresponding video image encoding apparatus, and
each of the predicted image generating units generates an image from a hash from a time used to estimate a motion vector, obtains an evaluation value of the motion vector used to generate the predicted image between the image generated from the hash and the predicted image, and generates the image quality information using the evaluation value as an estimated value of image quality.

13. The video image decoding apparatus according to claim 12,
wherein each of the predicted image generating units calculates, as the evaluation value of the motion vector, one of a sum of absolute differences between pixel values of each pixel and a mean of absolute differences between pixel values of each pixel between the image generated from the hash and the predicted image.

14. A video image encoding system, comprising:
the video image decoding apparatus according to claim 1; and
a corresponding video image encoding apparatus.

* * * * *